(12) United States Patent
Takagi

(10) Patent No.: US 10,839,727 B2
(45) Date of Patent: Nov. 17, 2020

(54) PROJECTOR AND CONTROL METHOD OF PROJECTOR

(71) Applicant: SEIKO EPSON CORPORATION, Tokyo (JP)

(72) Inventor: Kazuhiko Takagi, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/110,247

(22) Filed: Aug. 23, 2018

(65) Prior Publication Data

US 2019/0066552 A1 Feb. 28, 2019

(30) Foreign Application Priority Data

Aug. 24, 2017 (JP) .................................. 2017-160857

(51) Int. Cl.
*G09G 3/00* (2006.01)
*H04N 9/31* (2006.01)

(52) U.S. Cl.
CPC .......... *G09G 3/002* (2013.01); *H04N 9/3185* (2013.01); *G09G 2340/0464* (2013.01); *G09G 2340/0492* (2013.01); *G09G 2340/12* (2013.01)

(58) Field of Classification Search
CPC ... G09G 2340/0464; G09G 2340/0492; G09G 3/002; H04N 9/3185
See application file for complete search history.

(56) References Cited

U.S. PATENT DOCUMENTS 9,342,610 B2 * 5/2016 Liu .................... G06F 3/005
2012/0256824 A1 * 10/2012 Mizunuma .......... G06F 3/04886
345/156

(Continued)

FOREIGN PATENT DOCUMENTS

JP 2005-115093 A 4/2005
JP 2007-33739 A 2/2007

(Continued)

OTHER PUBLICATIONS

Seiko Epson Corp; Image Projection Device and Method for Controlling Image Projection Device; Oct. 5, 2015 (Year: 2015).*
Seiko Epson Corp; Oct. 5, 2015 (Year: 2015).*

*Primary Examiner* — Ming Wu
(74) *Attorney, Agent, or Firm* — Oliff PLC

(57) ABSTRACT

A projector includes: an accepting unit that accepts first image information indicating a first image; a first generating unit that generates second image information indicating a second image; a second generating unit that generates, based on the first image information and the second image information, third image information indicating a third image in which the second image is superimposed on the first image, and outputs the third image information and the first image information; an output unit for outputting the third image information output by the second generating unit; a third generating unit that applies image processing according to a positional relationship between the projector and a projection surface to the first image information output by the second generating unit to generate fourth image information; and a projecting unit that projects an image according to the fourth image information onto the projection surface.

15 Claims, 6 Drawing Sheets

(56) References Cited

U.S. PATENT DOCUMENTS

| 2014/0253722 | A1* | 9/2014 | Smyth ............... | H04N 5/23296 |
| | | | | 348/135 |
| 2016/0196692 | A1* | 7/2016 | Kjallstrom .......... | G06F 3/04815 |
| | | | | 345/633 |
| 2018/0003949 | A1* | 1/2018 | Kawahara ............ | G02B 26/101 |
| 2018/0164670 | A1* | 6/2018 | Kaji ........................ | G09G 5/00 |

FOREIGN PATENT DOCUMENTS

| JP | 2007-139923 A | 6/2007 |
| JP | 2009-86408 A | 4/2009 |
| JP | 2010-176250 A | 8/2010 |
| JP | 2015-176101 A | 10/2015 |

* cited by examiner

PROJECTOR AND CONTROL METHOD OF PROJECTOR

CROSS-REFERENCE

The entire disclosure of Japanese Patent Application No. 2017-160857, filed Aug. 24, 2017 is expressly incorporated by reference herein.

BACKGROUND

1. Technical Field

The present invention relates to a projector and a control method of a projector.

2. Related Art

JP-A-2015-176101 discloses a projector that projects a first composite image obtained by combining a first on-screen display (OSD) image with an input image to which image processing is applied in an image processing unit onto a projection surface, and also outputs image information indicating a second composite image obtained by combining the input image with a second OSD image to an external display device.

According to the projector disclosed in JP-A-2015-176101, the image projected onto the projection surface can be made different from the image displayed on the external display device by making the first OSD image and the second OSD image different from each other.

Incidentally, in the image (projection image) projected from the projector onto the projection surface, distortion may be generated with respect to the image indicated by the image information, or the orientation of the projection image may be reversed from the orientation of an image desired to be displayed (the orientation of the projection surface), due to the positional relationship between the projector and the projection surface.

For correcting the projection image, it is considered to execute image processing (hereinafter also referred to as "specific image processing") according to the positional relationship between the projector and the projection surface in the image processing unit of the projector disclosed in JP-A-2015-176101. Examples of the specific image processing include, for example, a trapezoidal distortion correction and an inversion process of the display orientation.

However, when the specific image processing is executed in the image processing unit of the projector disclosed in JP-A-2015-176101, a proper correction may be executed on the projection image while there is a risk that the image quality of the image displayed on the external display device may deteriorate with the specific image processing.

SUMMARY

An advantage of some aspects of the invention s to provide a technique by which it is possible to suppress the influence of image processing according to the positional relationship between a projector and a projection surface on image information output to the outside.

An aspect of a projector according to the invention includes: an accepting unit that accepts first image information indicating a first image; a first generating unit that generates second image information indicating a second image; a second generating unit that generates, based on the first image information and the second image information, third image information indicating; a third image in which the second image is superimposed on the first image, and outputs the third image information and the first image information; an output unit for outputting the third image information output by the second generating unit; a third generating unit that applies image processing according to a positional relationship between the projector and a projection surface to the first image information output by the second generating unit to generate fourth image information; and a projecting unit that projects an image according to the fourth image information onto the projection surface.

According to this aspect, although the image processing according to the positional relationship between the projector and the projection surface is applied to the first image information to generate the fourth image information, the image processing is not applied to the third image information output from the output unit. For this reason, it is possible to suppress the influence of the image processing according to the positional relationship between the projector and the projection surface on the third image information output to the outside.

In the aspect of the projector described above, it is desirable that the image processing includes a geometric correction on the first image.

According to the aspect with this configuration, for example, even when the geometric correction is applied to the first image for compensating for the distortion of a projection image, it is possible to suppress the influence of the geometric correction on the fourth image information.

In the aspect of the projector described above, it is desirable that the image processing includes a trapezoidal distortion correction on the first image.

According to the aspect with this configuration, for example, even when the trapezoidal distortion correction is applied to the first image for compensating for the distortion of the projection image, it is possible to suppress the influence of the trapezoidal distortion correction on the fourth image information.

In the aspect of the projector described above, it is desirable that the image processing includes a vertical inversion process on the first image.

According to the aspect with this configuration, for example, even when the vertical inversion process is applied to the first image for compensating for the orientation of display of the projection image, it is possible to suppress the influence of the vertical inversion process on the fourth image information.

In the aspect of the projector described above, it is desirable that the image processing includes a horizontal inversion process on the first image.

According to the aspect with this configuration, for example, even when the horizontal inversion process is applied to the first image for compensating for the orientation of display of the projection image, it is possible to suppress the influence of the horizontal inversion process on the fourth image information.

In the aspect of the projector described above, it is desirable that when the second generating unit accepts a first instruction to project the first image, the second generating unit outputs the first image information to the third generating unit.

According to the aspect with this configuration, for example, it is possible using the first instruction to control whether or not the first image information is output to the third generating unit.

In the aspect of the projector described above, it is desirable that when the second generating unit accepts a second instruction to output the third image information to the output unit, the second generating unit outputs the third image information to the output unit.

According to the aspect with this configuration, for example, it is possible using the second instruction to control whether or not the third image information is output to the output unit.

In the aspect of the projector described above, it is desirable that the first generating unit generates the second image information based on control information transmitted from a controller that controls the projector to the projector.

According to the aspect with this configuration, it is possible to control the second image based on the control information transmitted from the controller.

An aspect of a control method of a projector according to the invention includes: accepting first image information indicating a first image; generating second image information indicating a second image; generating, based on the first image information and the second image information, third image information indicating a third image in which the second image is superimposed on the first image; outputting the third image information from an output units applying image processing according to a positional relationship between the projector and a projection surface to the first image information to generate fourth image information; and projecting an image according to the fourth image information onto the projection surface.

According to this aspect, although the image processing according to the positional relationship between the projector and the projection surface is applied to the first image information to generate the fourth image information, the image processing is not applied to the third image information output from the output unit. For this reason, it is possible to suppress the influence of the image processing according to the positional relationship between the projector and the projection surface on the third image information output to the outside.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
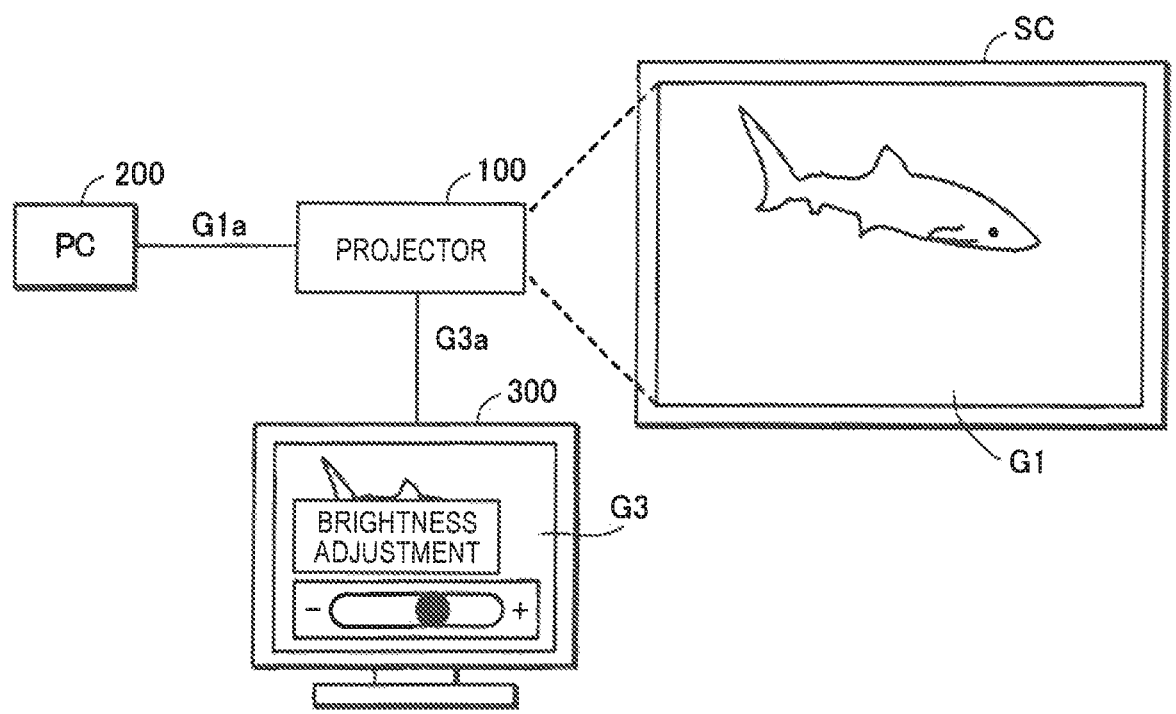
FIG. 1 is a diagram showing a projector according to a first embodiment.

Hereinafter, an embodiment according to the invention will be described with reference to the drawings. In the drawings, the dimensions and scale of each part are different from those of actual one. Moreover, the embodiment described below is a preferred specific example of the invention. For this reason, technically preferable various limitations are imposed on the embodiment. However, the scope of the invention is not limited to the embodiment unless there is a particular description to limit the invention in the following description.

First Embodiment

FIG. 1 is a diagram showing a projector 100 according to a first embodiment.

The projector 100 is connected with a personal computer (PC) 200 and a display device 300. The PC 200 provides image information G1a indicating an image G1 to the projector 100. The PC 200 is one example of an image information supply device. The display device 300 is a direct-view-type display device used by an operator of the projector 100.

The projector 100 can superimpose an OSD image on the image G1. In the embodiment, an image for adjusting the settings (e.g., the brightness setting of a projection image) of the projector 100 is used as the OSD image.

The projector 100 projects a projection image onto a projection surface SC such as a screen. The projection surface SC is installed at, for example, an event site, and the audience of the event views the image projected onto the projection surface SC. The OSD image is less necessary for the audience of the event in many cases. In the embodiment, the projector 100 can project the image G1 on which the OSD image is not superimposed onto the projection surface SC.

Moreover, the projector 100 can display a composite image G3 in which the OSD image is superimposed on the image G1 on the display device 300. For this reason, the operator of the projector 100 can adjust the settings of the projector 100 using the 050 image in the composite image G3.

Further, the projector 100 performs image processing (hereinafter also referred to as "specific image processing") according to the positional relationship between the projector 100 and the projection surface SC on the image G1 projected onto the projection surface SC. On the other hand, the projector 100 does not perform the specific image processing on the composite image G3 displayed on the display device 300. One example of the specific image processing includes a trapezoidal distortion correction. The trapezoidal distortion correction is also one example of a geometric correction.

Figure 2:
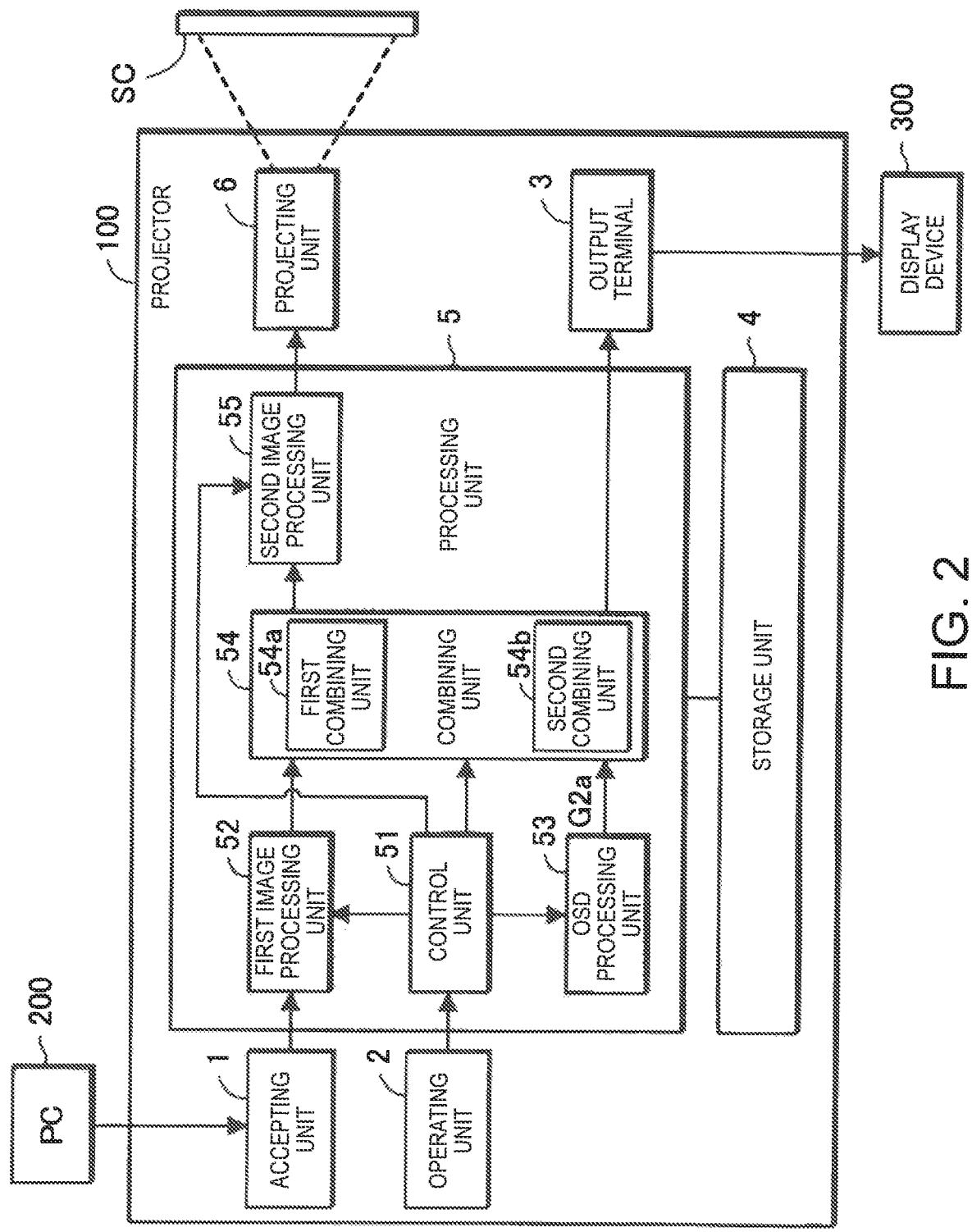
FIG. 2 is a diagram showing one example of the projector.

FIG. 2 is a diagram showing one example of the projector 100. The projector 100 includes an accepting unit 1, an operating unit 2, an output terminal 3, a storage unit 4, a processing unit 5, and a projecting unit 6.

The accepting unit 1 is, for example, an input terminal for image information. The accepting unit 1 may accept image information via wireless communication. The accepting unit 1 accepts the image information G1a from the PC 200.

Figure 3:
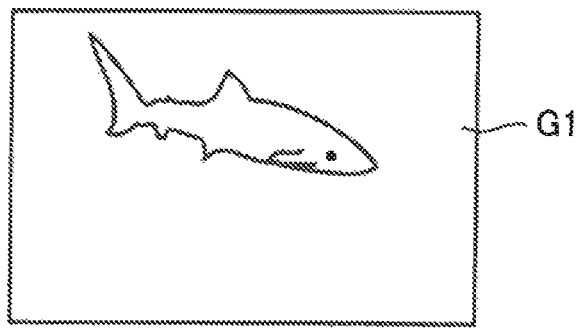
FIG. 3 is a diagram showing one example of an image.

FIG. 3 is a diagram showing one example of the image G1 indicated by the image information G1a. The image G1 is one example of a first image. The image information. G1a is one example of first image information.

The operating unit 2 includes various operating keys for accepting an input, to the projector 100. The operating unit 2 accepts setting information on the specific image processing, a first instruction, a second instruction, a third instruction, and a fourth instruction according to an operation (operation input) on the operating keys. The first instruction is an instruction to project the image G1. The second instruction is an instruction to output composite image information G3a indicating the composite image G3 to the output terminal 3. The third instruction is an instruction to project the composite image G3. The fourth instruction is an instruction to output the image information G1a to the output terminal 3.

Moreover, the operating unit 2 accepts, according to an operation (operation input) on the operating keys, a generation instruction to generate OSD image information G2a to be described later, and an adjustment instruction (an instruction to brighten the projection image and an instruction to darken the projection image) to adjust the brightness of the projection image using the OSD image displayed on the display device 300.

The output terminal 3 is one example of an output unit. The output terminal 3 is used to output image information. In the embodiment, the output terminal 3 is connected to the display device 300 through a cable (not shown) or the like.

The storage unit 4 is a computer-readable recording medium. The storage unit 4 is, for example, a flash memory. The storage unit 4 is not limited to a flash memory but can be appropriately changed. The storage unit 4 stores, for example, programs executed by the processing unit 5.

The processing unit 5 is, for example, a computer such as a central processing unit (CPU). The processing unit 5 may be configured of one or a plural of processors. The processing unit 5 reads and executes the programs stored in the storage unit 4 to thereby realize a control unit 51, a first image processing unit 52, an OSD processing unit 53, a combining unit 54, and a second image processing unit 55.

The control unit controls the first image processing unit 52, the OSD processing unit 53, the combining unit 54, and the second image processing unit 55.

For example, the control unit 51 outputs the generation instruction accepted by the operating unit 2 to the OSD processing unit 53 and controls the OSD processing unit 53. The control unit 51 outputs the adjustment instruction accepted by the operating unit 2 to the first image processing unit 52 and the OSD processing unit 53 and controls the first image processing unit 52 and the OSD processing unit 53. The control unit 51 outputs the first instruction, the second instruction, the third instruction, and the fourth instruction accepted by the operating unit 2 to the combining unit 54 and controls the combining unit 54. The control unit 51 controls the specific image processing in the second image processing unit 55 based on the setting information accepted by the operating unit 2.

The first image processing unit 52 applies a resolution conversion process to the image information G1a. Moreover, the first image processing unit 52 applies a brightness adjustment process for adjusting the brightness of the image G1 to the image information G1a in response to the adjustment instruction. Hereinafter, for simplifying the description, the image information G1a to which the resolution conversion process and the brightness adjustment process have been applied is also referred to as "image information G1a".

The OSD processing unit 53 is one example of a first generating unit. The OSD processing unit 53 generates, in response to the generation instruction accepted by the operating unit 2, the OSD image information G2a indicating an OSD image G2. The OSD image G2 is one example of a second image. The OSD image information G2a is one example of second image information.

Figure 4:
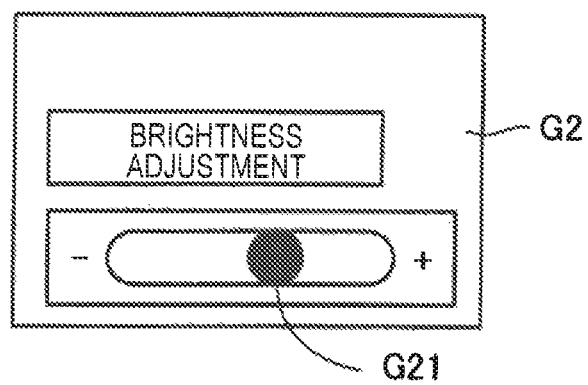
FIG. 4 is a diagram showing one example of an OSD image.

FIG. 4 is a diagram showing one example of the OSD image G2 indicated by the OSD image information G2a. The OSD image G2 shown in FIG. 4 is a setting image for adjusting the brightness of the projection image.

Figure 5:
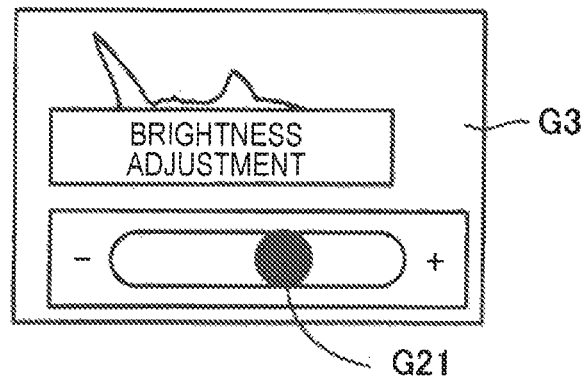
FIG. 5 is a diagram showing one example of a composite image.

The combining unit 54 is one example of a second generating unit. The combining unit 54 generates the composite image information G3a indicating the composite image G3 based on the image information G1a and the OSD image information G2a. The composite image G3 is one example of a third image. The composite image information G3a one example of third image information. The combining unit 54 outputs, for example, the composite image information G3a and the image information G1a. FIG. 5 is a diagram showing one example of the composite image G3 indicated by the composite image information G3a.

The combining unit 54 includes a first combining unit 54a and a second combining unit 54b.

When the first combining unit 54a accepts the first instruction, the first combining unit 54a outputs the image information G1a to the second image processing unit 55. When the first combining unit 54a accepts the third instruction, the first combining unit 54a generates the composite image information G3a based on the image information G1a and the OSD) image information G2a and outputs the generated composite image information G3a to the second image processing unit 55.

When the second combining unit 54b accepts the second instruction, the second combining unit 54b generates the composite image information G3a based on the image information G1a and the OSD) image information G2a and outputs the generated composite image information G3a to the output terminal 3. When the second combining unit 54b accepts the fourth instruction, the second combining unit 54b outputs the image information G1a to the output terminal 3.

The second image processing unit 55 is one example of a third generating unit. The second image processing unit 55 applies the specific image processing to the image information (the image information G1a or the composite image information G3a) output by the first combining unit 54a to generate image information for projection. The image information for projection is one example of fourth image information.

In the embodiment, the second image processing unit 55 executes, as the specific image processing, a process for correcting a trapezoidal distortion of the projection image of the projector 100, that is, a trapezoidal distortion correction.

The projecting unit 6 projects and displays the projection image according to the image information for projection output by the second image processing unit 55 on the projection surface SC.

Figure 6:
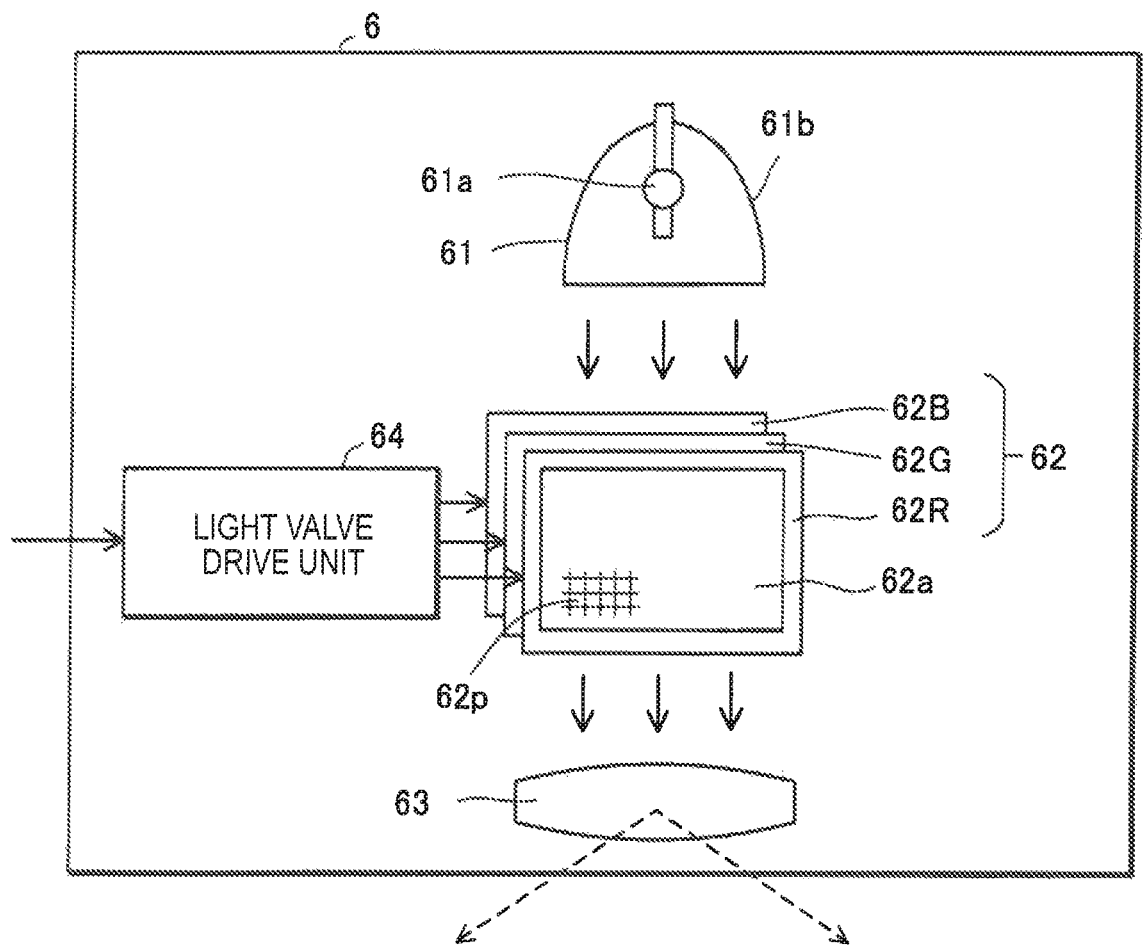
FIG. 6 is a diagram showing one example of a projecting unit.

FIG. 6 is a diagram showing one example of the projecting unit 6. The projecting unit 6 includes a light source 61, three liquid crystal fight valves 62 (62R, 62G, 62B) as one example of a light modulator, a projection lens 63 as one example of a projection optical system, and a light valve drive unit 64. The projecting unit 6 modulates light emitted from the light source 61 with the liquid crystal light valves 62 to form a projection image (image light), and enlarges and projects the projection image through the projection lens 63. The projection image is displayed on the projection surface SC.

The light source 61 includes alight source unit 61a composed of a xenon lamp, an extra-high-pressure mercury lamp, a light emitting diode (LED), a laser light source, or the like, and a reflector 61b that reduces variations in the direction of light radiated by the light source unit 61a. Variations in the brightness distribution of the light emitted from the light source 61 are seduced by an integrator optical system (not shown). Thereafter, the light is separated by a color separating optical system (not shown) into color light components of red (R) green (G), and blue (B), which are three primary colors of light. The color light components of R, G, and B are respectively incident on the liquid crystal light valves 62R, 62G, and 62B.

The liquid crystal light valve 62 is configured of a liquid crystal panel in which liquid crystal is sealed between a pair of transparent substrates, or the like. A rectangular pixel region 62a composed of a plurality of pixels 62p arranged in a matrix is formed in the liquid crystal light valve 62. In the liquid crystal light valve 62, a drive voltage can be applied to the liquid crystal for each of the pixels 62p. When the light valve drive unit 64 applies a drive voltage according to the image information for projection input from the second image processing unit 55 to each of the pixels 62p, each of the pixels 62p is set to a light transmittance according to the image information for projection. For this reason, the light emitted from the light source 61 is modulated by transmitting through the pixel region 62a, and a projection image according to the image information for projection is formed for each color light.

The images of the respective colors are combined for each of the pixels 62p by a color combining optical system (not shown), and projection image light (projection image) that is color image light (color image) is generated. The projection image light is enlarged and projected onto the projection surface SC by the projection lens 63.

Next, operation will be described.

Figure 7:
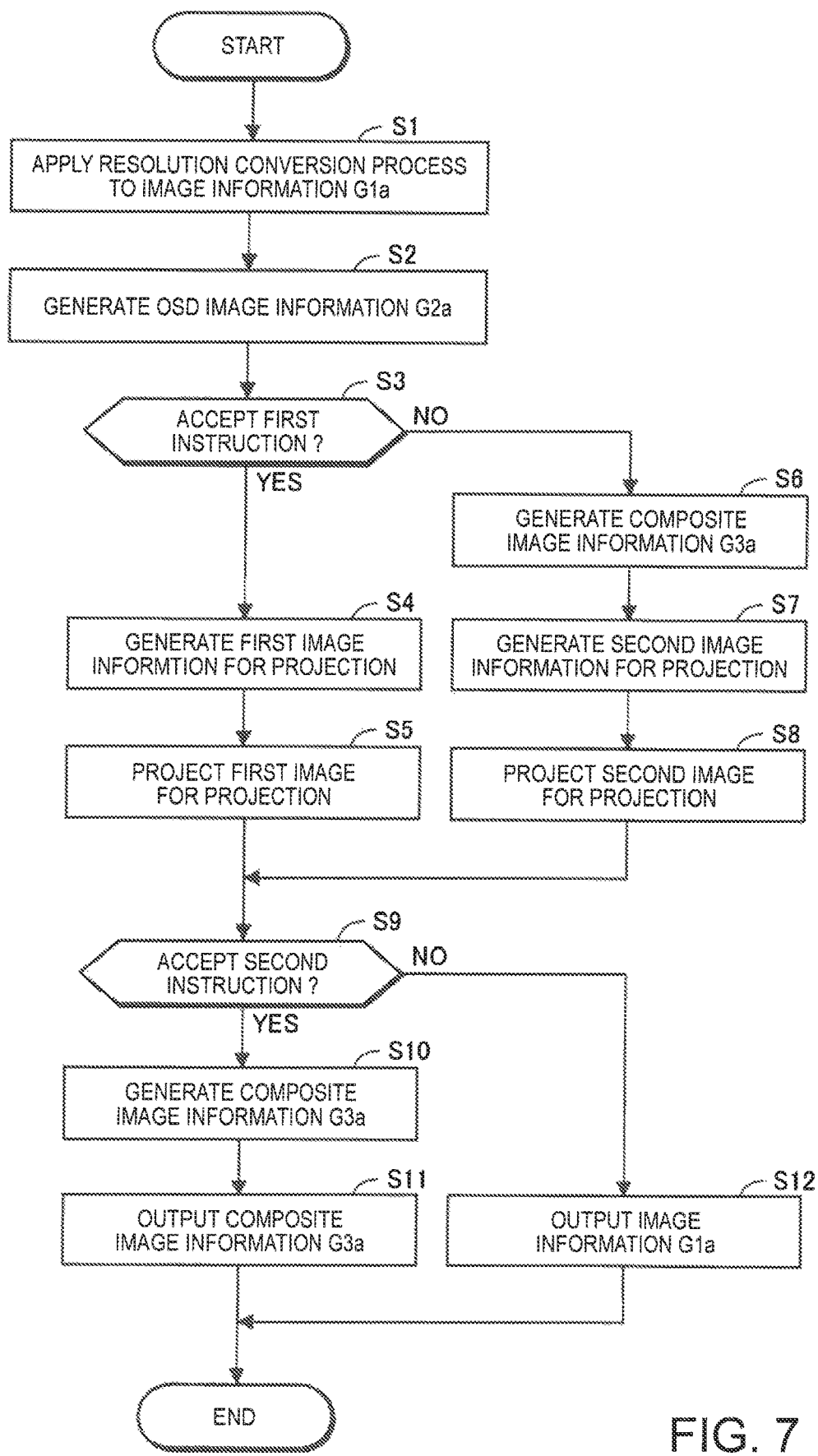
FIG. 7 is a flowchart for explaining the operation of the projector.

FIG. 7 is a flowchart for explaining the operation of the projector 100. In the following, it is assumed that the first instruction and the third instruction are alternatively input to the operating unit 2, and that the second instruction and the fourth instruction are alternatively input to the operating unit 2. Moreover, it is assumed that the generation instruction and the setting information (e.g., parameters for determining the process content of a trapezoidal distortion correction process) on the specific image processing are input to the operating unit 2, and that the process content (trapezoidal distortion correction) based on the setting information is confirmed in the second image processing unit 55.

First, the first image processing unit 52 applies the resolution conversion process to the image information G1a accepted by the accepting unit 1 (Step S1). The first image processing unit 52 outputs the image information G1a to which the resolution conversion process is applied to the combining unit 54. The OSD processing unit 53 generates the OSD image information G2a in response to the generation instruction accepted by the operating unit 2 (Step S2).

Subsequently, if the first combining unit 54a accepts the first instruction (YES in Step S3), the first combining unit 54a outputs the image information G1a accepted from the first image processing unit 52 to the second image processing unit 55. The second image processing unit 55 applies the specific image processing (trapezoidal distortion correction) to the image information G1a to generate first image information for projection (Step S4). The first image information for projection is one example of the image information for projection. Subsequently, the projecting unit 6 projects a first image for projection (specifically, the image G1) according to the first image information for projection onto the projection surface SC (Step S5).

On the other hand, if the first combining unit 54a accepts the third instruction (NO in Step S3), the first combining unit 54a generates the composite image information G3a using the image information G1a accepted from the first image processing unit 52 and the OSD image information G2a generated by the OSD processing unit 53 (Step S6). Subsequently, the first combining unit 54a outputs the composite image information G3a to the second image processing unit 55. The second image processing unit 55 applies the specific image processing to the composite image information G3a to generate second image in for projection (Step S7). The second image information for projection is another example of the image information for projection. Subsequently, the protection unit 6 projects a second image for projection (specifically, the composite image G3) according to the second image information for projection (Step S8).

If the second combining unit 54b accepts the second instruction (YES in Step S9), the second combining unit 54b generates the composite image information G3a using the image information G1a accepted from the first image processing unit 52 and the OSD image information G2a generated by the OSD processing unit 53 (Step S1). Subsequently, the second combining unit 54b outputs the composite image information G3a to the output terminal 3. The composite image information G3a is output from the output terminal 3 to the display device 300 (Step S11). The display device 300 displays the composite image G3 according to the composite image information G3a.

On the other hand, if the second combining unit 54b accepts the fourth instruction (NO in Step S9) the second combining unit 54b outputs the image information G1a accepted from, the first image processing unit 52 to the output terminal 3. The image information G1a is output from the output terminal 3 to the display device 300 (Step S12). The display device 300 displays the image G1 according to the image information G1a.

When the operator of the projector 100 inputs the adjustment instruction to the operating unit 2 in a situation where the display device 300 displays the composite image G3, the control unit 51 outputs the adjustment instruction accepted by the operating unit 2 to the first image processing unit 52 and the OSD processing unit 53.

The first image processing unit 52 adjusts the brightness of the image G1 according to the adjustment instruction. The OSD processing unit 53 adjusts the brightness of the OSD image G2 according to the adjustment instruction. Further, the 053 processing unit 53 changes the OSD image information G2a according to the adjustment of the brightness of the OSD image G2 to change the position of a button G21 in the OSD image G2.

According to the projector 100 and the control method of the projector 100 according to the embodiment, for example, when the first instruction and the second instruction are input, the specific image processing according to the positional relationship between the projector 100 and the projection surface SC is applied to the image information G1a to generate the first image information for projection while the specific image processing is not applied to the composite image information. G3a output from the output terminal 3. For this reason, it is possible to suppress the influence of the specific image processing on the composite image information G3a output to the outside.

Moreover, it is possible using the first instruction and the third instruction to switch whether or not the OSD image G2 is displayed on the projection surface SC, and it is possible using the second instruction and the fourth instruction to switch whether or not the OSD image G2 is displayed on the display device 300. For this reason, the display of the OSD image G2 can be easily switched between ON and OFF.

MODIFIED EXAMPLES

The invention is not limited to the embodiment described above, but various modifications can be made, for example, as described below. Moreover, one or a plurality of modifications arbitrarily selected from the modified aspects described below can be appropriately combined.

Modified Example 1

The order of processes shown in the flowchart of FIG. 7 can be appropriately changed. For example, Steps S9 to S12 may be executed before Steps S2 to S8.

Modified Example 2

In the embodiment described above, the image information output from the combining unit 54 to the second image processing unit 55 can be switched between the image information G1a and the composite image information G3a using the first instruction and the third instruction. However, the image information output from the combining unit 54 to the second image processing unit 55 may be fixed to be the image information G1a.

Modified Example 3

In the embodiment described above, the image information output from the combining unit 54 to the output terminal 3 can be switched between the image information G1a and the composite image information G3a using the second instruction and the fourth instruction. However, the image information output from the combining unit 54 to the output terminal 3 may be fixed to be the composite image information G3a.

Modified Example 4

In the embodiment described above, the output terminal 3 is used as the output unit. However, the output unit is not limited to the output terminal 3 but can be appropriately changed. For example, a communication unit that wirelessly transmits the image information to the display device 300 or the like may be used as the output unit.

Modified Example 5

In the embodiment described above, the trapezoidal distortion correction, which is one example of the geometric correction, is used as the specific image processing (image processing according to the positional relationship between the projector 100 and the projection surface SC).

However, the specific image processing may be a process including at least the trapezoidal distortion correction, even a process including at least the geometric correction.

Moreover, for example, when the vertical relationship of the projection surface SC is reversed from the vertical relationship of the projection image, the specific image processing may include a vertical inversion process (process for inverting the vertical relationship of the projection image) on the projection image.

Moreover, for example, when the horizontal relationship of the projection surface SC is reversed from the horizontal relationship of the projection image, the specific image processing may include a horizontal inversion process (process for inverting the horizontal relationship of the projection image) on the projection image.

Modified Example 6

The OSD processing unit 53 may generate the OSD image information G2a based on, for example, control information transmitted from a remote controller of the projector 100.

Figure 8:
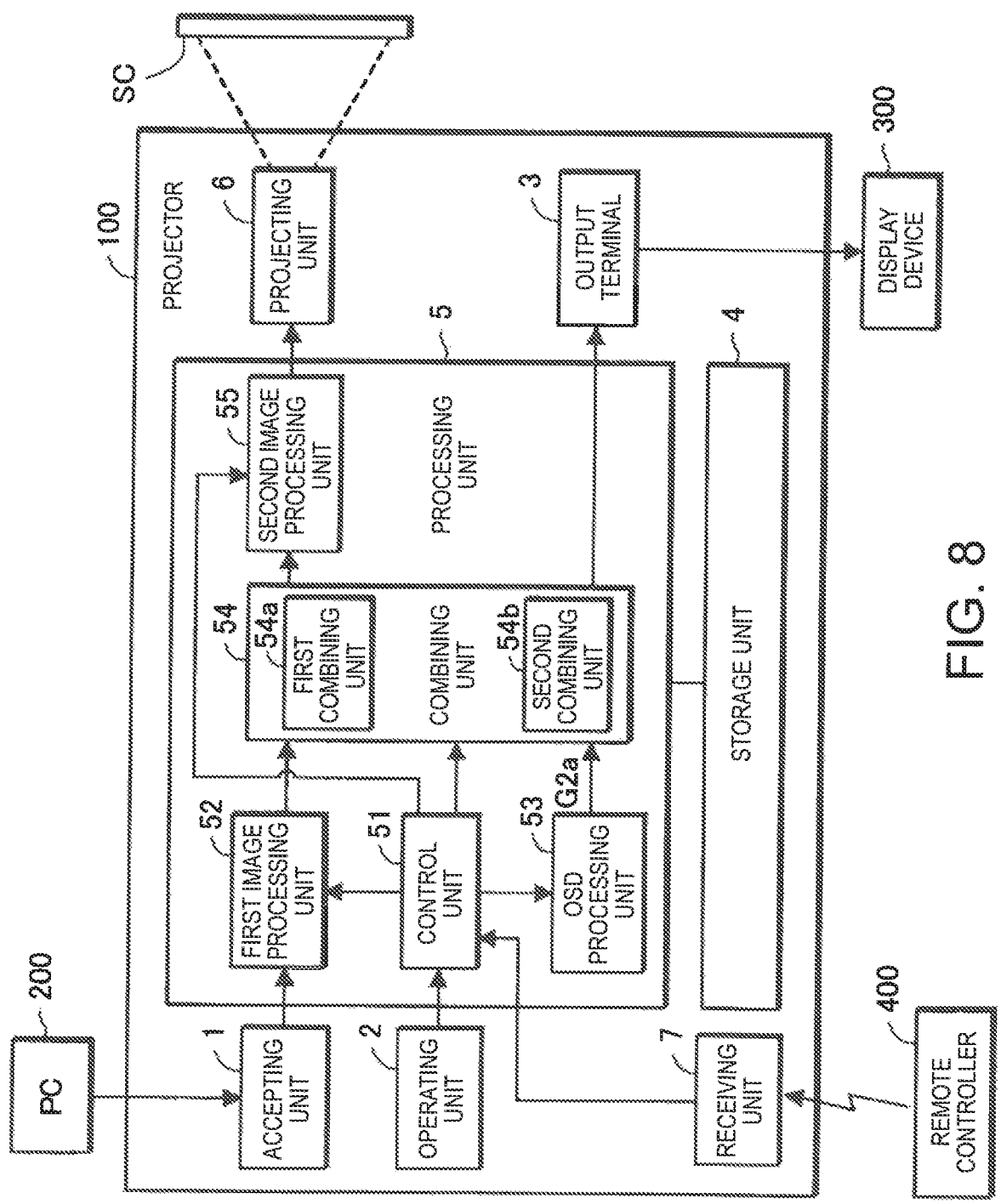
FIG. 8 is a diagram showing a modified example of the projector.

FIG. 8 is a diagram showing an example of the projector in which the OSD processing unit 53 generates the OSD image information G2a based on control information transmitted from a remote controller 400.

The remote controller 400 is one example of a controller. The remote controller 400 is operated by the operator of the projector 100. The remote controller 400 transmits, for example, the generation instruction and the adjustment instruction to the projector 100. Each of the generation instruction and the adjustment instruction is one example of the control information.

A receiving unit 7 receives the generation instruction and the adjustment instruction transmitted by the remote controller 400.

When the receiving unit 7 receives the generation instruction, the control unit 51 outputs the generation instruction to the OSD processing unit 53. The OSD processing unit 53 generates the OSD image information G1a in response to the generation instruction.

Moreover, when the receiving unit 7 receives the adjustment instruction, the control unit 51 outputs the adjustment instruction to the first image processing unit 52 and the OSD processing unit 53. The first image processing unit 52 adjusts the brightness of the image G1 according to the adjustment instruction. The OSD processing unit 53 adjusts the brightness of the OSD image G2 according to the adjustment instruction. Further, the OSD processing unit 53 changes the OSD image information G2a according to the adjustment of the brightness of the OSD image G2, in other words, generates the OSD image information G1a according to the adjustment of the brightness of the OSD image G2 to change the position of the button G21 in the OSD image G2.

Modified Example 7

The installation location of the projection surface SC is not limited to an event site but can be appropriately changed. For example, the projection surface SC may be installed in a conference room. Moreover, the projection surface SC may be a wall of a conference room, an external wall of a building, or an article of commerce onto which the projection image is projected.

Modified Example 8

The OSD image G2 is not limited to the image for adjusting the brightness setting of the projection image but can be appropriately changed. For example, the OSD image G2 may be an image for adjusting the hue of the projection image, or may be an image for urging the operator of the projector to perform a predetermined operation. That is, the OSD image G2 may or may not be an image for adjusting the settings of the projector 100.

Modified Example 9

Although a liquid crystal light valve is used as a light modulator in the projecting unit 6, the light modulator is not limited to a liquid crystal light valve but can be appropriately changed. For example, the light modulator may have a configuration using three reflective liquid crystal panels. Moreover, the light modulator may have a configuration of a type using one liquid crystal panel, a type using three digital mirror devices (DMDs), a type using one digital mirror device, or the like. When only one liquid crystal panel or DMD is used as the light modulator, the member corresponding to the color separating optical system or the color combining optical system is unnecessary. Moreover, in addition to a liquid crystal panel and a DMD, a configuration that can modulate light emitted by a light source can be employed as the light modulator.

Modified Example 10

All or a portion of the elements realized when the processing unit 5 executes programs may be realized by hardware using an electronic circuit such as, for example, a field programmable gate array (FPGA) or an application specific IC (ASIC), or may be realized by cooperation between software and hardware.

What is claimed is:

1. A projector comprising:
    an input terminal that accepts first image information indicating a first image;
    one or more processors programmed to
        generate second image information indicating a second image;
        generate, based on the first image information and the second image information, third image information indicating a third image in which the second image is superimposed on the first image; and
        apply image processing according to a positional relationship between the projector and a projection surface to the first image information to generate fourth image information indicating a fourth image;
    an output terminal that outputs the third image information to an external display device; and
    a projection lens that projects the fourth image according to the fourth image information onto the projection surface, wherein
    the image processing according to the positional relationship between the projector and the projection surface is not applied to the third image information prior to output to the external display device,
    the output terminal outputs the third image information so that the external display device displays the third image while the projection lens projects the fourth image, and
    the fourth image is generated by applying the image processing according to the positional relationship between the projector and the projection surface to the first image information indicating the first image after image processing without superimposing the second image.

2. The projector according to claim 1, wherein
    the image processing includes a geometric correction on the first image.

3. The projector according to claim 1, wherein
    the image processing includes a trapezoidal distortion correction on the first image.

4. The projector according to claim 1, wherein
    the image processing includes a vertical inversion process on the first image.

5. The projector according to claim 1, wherein
    the image processing includes a horizontal inversion process on the first image.

6. The projector according to claim 1, wherein
    when the one or more processors accept a first instruction to project the first image, the one or more processors output the first image information.

7. The projector according to claim 1, wherein
    when the one or more processors accept a second instruction to output the third image information to the output terminal, the one or more processors output the third image information to the output terminal.

8. The projector according to claim 1, wherein
    the one or more processors generate the second image information based on control information transmitted from a controller that controls the projector to the projector.

9. The projector according to claim 1, wherein
    when the one or more processors accept a third instruction, the one or more processors apply the image processing according to the positional relationship between the projector and the projection surface to the first image information to generate the fourth image information indicating the fourth image, the fourth image being the first image after image processing without superimposing the second image, and
    when the one or more processors accept a fourth instruction, the one or more processors apply the image processing according to the positional relationship between the projector and the projection surface to the first image information to generate the fourth image information indicating the fourth image, the fourth image being the first image after image processing which includes superimposing the second image.

10. A control method of a projector, comprising:
    accepting first image information indicating a first image;
    generating second image information indicating a second image;
    generating, based on the first image information and the second image information, third image information indicating a third image in which the second image is superimposed on the first image;
    outputting the third image information to an external display device;
    applying image processing according to a positional relationship between the projector and a projection surface to the first image information to generate fourth image information indicating a fourth image; and
    projecting the fourth image according to the fourth image information onto the projection surface, wherein
    the image processing according to the positional relationship between the projector and the projection surface is not applied to the third image information prior to output to the external display device,
    the third image information is output so that the external display device displays the third image while the fourth image is projected, and
    the fourth image is generated by applying the image processing according to the positional relationship between the projector and the projection surface to the first image information indicating the first image after image processing without superimposing the second image.

11. The projector according to claim 1, wherein the second image information includes at least one of a brightness setting, a hue setting, and a notification.

12. The control method according to claim 10, further comprising:
    when accepting a third instruction, applying the image processing according to the positional relationship between the projector and the projection surface to the first image information to generate the fourth image information indicating the fourth image, the fourth image being the first image after image processing without superimposing the second image, and
    when accepting a fourth instruction, applying the image processing according to the positional relationship between the projector and the projection surface to the first image information to generate fourth image information indicating the fourth image, the fourth image being the first image after image processing which includes superimposing the second image.

13. The control method according to claim 10, wherein the second image information includes at least one of a brightness setting, a hue setting, and a notification.

14. A projection system comprising:
a display device that displays an image; and
a projector including:
  an input terminal that accepts first image information indicating a first image;
  one or more processors programmed to
    generate second image information indicating a second image,
    generate, based on the first image information and the second image information, third image information indicating a third image in which the second image is superimposed on the first image, and
    apply image processing according to a positional relationship between the projector and a projection surface to the first image information to generate fourth image information indicating a fourth image;
  an output terminal that outputs the third image information to the display device; and
  a projection lens that projects the fourth image according to the fourth image information onto the projection surface; wherein
the image processing according to the positional relationship between the projector and the projection surface is not applied to the third image information prior to output to the display device,
the display device displays the third image while the projection lens projects the fourth image, and
the fourth image is generated by applying the image processing according to the positional relationship between the projector and the projection surface to the first image information indicating the first image after image processing without superimposing the second image.

15. The projection system according to claim 14, wherein the second image information includes at least one of a brightness setting, a hue setting, and a notification.

* * * * *